United States Patent [19]

Ishikawa et al.

[11] Patent Number: 5,318,802
[45] Date of Patent: Jun. 7, 1994

[54] MODIFYING A WOOD MATERIAL UTILIZING FORMALDEHYDE POLYMER AND SULFUR DIOXIDE

[75] Inventors: Hiroyuki Ishikawa, Nara; Arihiro Adachi, Neyagawa; Hiroaki Usui, Kadoma, all of Japan

[73] Assignee: Matsushita Electric Works, Ltd., Kadoma, Japan

[21] Appl. No.: 49,293

[22] Filed: Apr. 20, 1993

[30] Foreign Application Priority Data

Oct. 30, 1992 [JP] Japan ................... 4-293001

[51] Int. Cl.$^5$ ............................... B05D 7/06
[52] U.S. Cl. ................... 427/254; 427/397; 427/341; 427/342; 427/351; 427/393; 427/440
[58] Field of Search ............... 427/393, 351, 254, 297, 427/341, 342, 440

[56] References Cited

U.S. PATENT DOCUMENTS 2,870,041 1/1959 Waddle et al. ................ 427/342
3,524,763 8/1970 Tarauella et al. .............. 427/342

FOREIGN PATENT DOCUMENTS 4125103 4/1992 Japan ..................... 427/351

*Primary Examiner*—Shrive Beck
*Assistant Examiner*—Brain K. Talbot
*Attorney, Agent, or Firm*—Armstrong, Westerman, Hattori, McLeland & Naughton

[57] ABSTRACT

In a method of treating a raw wood material with a formaldehyde polymer in the presence of sulfur dioxide at a reaction temperature within a reaction vessel to obtain a modified wood material, sulfur dioxide is supplied into the reaction vessel when a gas pressure of the formaldehyde polymer within the reaction vessel is $4.00 \times 10^4$ Pa or more. In addition, a concentration of the formaldehyde polymer is in a range of 30 to 350 mol/m$^3$ of formaldehyde monomer, and a molar ratio of the formaldehyde polymer to sulfur dioxide is in a range of 10 to 350. As the formaldehyde polymer, for example, trioxane, tetraoxane, or paraformaldehyde is used. The modified wood material manufactured by the method including the above conditions shows excellent dimensional stability while a discoloration thereof is effectively prevented. Therefore, the modified wood material is particularly fit to use for an interior furniture, musical instrument and a bath tub, etc.

10 Claims, No Drawings

MODIFYING A WOOD MATERIAL UTILIZING FORMALDEHYDE POLYMER AND SULFUR DIOXIDE

BACKGROUND OF THE INVENTION

1. Field of the Invention

The present invention relates to a method of manufacturing a modified wood material with excellent dimensional stability while preventing a discoloration thereof.

2. Description of the Prior Art

It is known that a raw wood material is treated with a formaldehyde polymer in the presence of sulfur dioxide at a reaction temperature within a reaction vessel to obtain a modified wood material. The formaldehyde polymer is selected from a formaldehyde derivative such as trioxane, tetraoxane and paraformaldehyde, etc. In addition, an accelerator is used for accelerating depolymerization of the formaldehyde polymer to formaldehyde monomer. The accelerator is selected from a chloride such as hydrogen chloride, zinc chloride, ferrous chloride, ferric chloride, magnesium chloride and ammonium chloride, and a sulfate, e.g., ferric sulfate, etc. Since adjacent hydroxyl groups of cellulose, hemicellulose or lignin, etc., in the raw wood material are bridged by formaldehyde monomer, hydrophilicity of the wood material is decreased by the resulting cross-linking structure. As a result, though the modified wood material has a weight gain of about 5 to 10%, an antiswelling efficiency thereof is increased to 50 to 60%. K. Minato, et al. describe about a method of manufacturing a modified wood material in Mokuzai Gakkaishi, Vol. 36, No. 10, P.860–866 (1990). That is, wood specimen and trioxane are provided in a heated desiccator, and then the air in the desiccator is exhausted to the outside. Immediately after a predetermined amount of sulfur dioxide is introduced into the desiccator, the desiccator is heated in an oven to vaporize trioxane and sulfur dioxide and react the wood specimen with a vapor of trioxane in the presence of a vapor of sulfur dioxide, so that a modified wood specimen having high antiswelling efficiency and moisture excluding efficiency is obtained. For example, the wood specimen is treated with the vapor of trioxane in the presence of the vapor of sulfur dioxide at a reaction temperature of 100° C. for 24 hours. On the assumption that trioxane is completely depolymerized to formaldehyde monomer, the concentration of trioxane is $1.48 \times 10^{-2}$ mol/dm$^3$. On the other hand, the concentration of sulfur dioxide is in a range of $1.0 \times 10^{-3}$ to $4.0 \times 10^{-3}$ mol/dm$^3$. However, in the method of Minato, et al., there is a problem of causing carbonization of the wood specimen by the vapor of sulfur dioxide prior to the reaction of the vapor of trioxane with the wood specimen, so that a discoloration of the modified wood material occurs. Particularly, in case of using the modified wood material for an interior furniture, a musical instrument and a bath tub, etc, the discoloration must be prevented. When the raw wood material is treated with the formaldehyde polymer in the presence of sulfur dioxide and ferric sulfate, it is known that the discoloration of the modified wood material is improved to some extent. However, it is not enough to use the modified wood material for these applications. In addition, there is another problem that the cross-linking structure is formed only toward a depth of 2 or 3 mm from the surface of the wood material. When a thick wood material is treated with the formaldehyde polymer, or when a volume ratio of the wood material relative to the reaction vessel is increased, it is hardly expected that the cross-linking structure is uniformly formed in the modified wood material. Consequently, good dimensional stability of the modified wood material is not obtained.

SUMMARY OF THE INVENTION

A method of manufacturing a modified wood material capable of improving the above problems is provided in the present invention. In case that a raw wood material is treated with a formaldehyde polymer in the presence of sulfur dioxide at a reaction temperature within a reaction vessel to form the modified wood material, the following conditions are very effective to prevent a discoloration of the modified wood material and to uniformly treat the raw wood material with the formaldehyde polymer. That is, sulfur dioxide is supplied into the reaction vessel when a gas pressure of the formaldehyde polymer within the reaction vessel is $4.00 \times 10^4$ Pa or more. A concentration of the formaldehyde polymer is in a range of 30 to 350 mol/m$^3$ of formaldehyde monomer resulting from the formaldehyde polymer. A molar ratio of the formaldehyde polymer relative to sulfur dioxide is in a range of 10 to 350. When the modified wood material is manufactured in accordance with the method including the above conditions of the present invention, it has excellent dimensional stability while the discoloration thereof is effectively prevented.

Therefore, it is a primary object of the present invention to provide a method of manufacturing a modified wood material with excellent dimensional stability while preventing a discoloration of the wood material.

The formaldehyde polymer is at least one selected from the group consisting of trioxane, tetraoxane, and paraformaldehyde. On the other hand, it is preferred that an accelerator is used for accelerating depolymerization of the formaldehyde polymer to formaldehyde monomer. The accelerator includes at least one selected from the group consisting of a chloride of hydrogen chloride, zinc chloride, ferrous chloride, ferric chloride, magnesium chloride and ammonium chloride, a sulfate of ferric sulfate, and a borate. In this case, a molar ratio of the formaldehyde polymer relative to sulfur dioxide and the accelerator is in a range of 10 to 300.

It is further preferred that a ratio of a volume of the raw wood material to be provided into the reaction vessel relative to a capacity of the reaction vessel is in a range of 0.01 to 0.4 (m$^3$/m$^3$).

It is another preferred that the reaction temperature is in a range of 90° to 120° C.

The method for fabricating the modified wood material of the present invention will be detailed hereinafter.

DETAILED DESCRIPTION OF THE INVENTION

In a method of manufacturing a modified wood material by treating a raw wood material with a formaldehyde polymer in the presence of sulfur dioxide at a reaction temperature within a reaction vessel, a shape and species of the raw wood material are not limited. For example, a log, plywood, or a veneer, etc., is used as the raw wood material. It is preferred that a seasoning of the raw wood material is proceeded such that a moisture content thereof is less than 10 wt %. When the raw wood material having an excessive moisture content is used, a chain structure of oxymethylene is readily formed by a polymerization of formaldehyde monomer, so that it is hardly expected that the modified wood material with excellent dimensional stability is obtained, and also a discoloration of the modified wood material is prevented. An air drying, hot air drying, or a radio frequency drying, etc., is applied for the seasoning. In the method of the present invention, an optimum ratio of a volume of the raw wood material to be provided into the reaction vessel relative to a capacity of the reaction vessel is in a range of 0.01 to 0.4 (m$^3$/m$^3$). The formaldehyde polymer includes at least one selected from the group consisting of trioxane, tetraoxane, and paraformaldehyde, etc. The formaldehyde polymer is easily depolymerized to a gas of formaldehyde monomer by heating thereof. Particularly, since a solid of trioxane or tetraoxane does not have the scent of formalin, and also can be easily sublimated to generate the gas thereof, it is useful for an industrialization of manufacturing the modified wood material. A solid or liquid of the formaldehyde polymer is provided into the reaction vessel together with the raw wood material. In the present invention, a concentration of the formaldehyde polymer is in a range of 30 to 350 mol/m$^3$ of formaldehyde monomer. The concentration is defined as the number of moles per unit volume of the reaction vessel. When the concentration is less than 30 mol/m$^3$, a cross-linking structure formed by bridging adjacent hydroxyl groups of the raw wood material by formaldehyde monomer is not efficiently obtained. The concentration of the formaldehyde polymer greater than 350 mol/m$^3$ gives no increased benefits and merely adds unnecessary to the cost. A molar ratio of the formaldehyde polymer relative to sulfur dioxide is in a range of 10 to 350. When the molar ratio is less than 10, the cross-linking structure is not efficiently obtained. In case of more than 350 of the molar ratio, a heavy discoloration of the modified wood material occurs. It is also preferred that an accelerator for accelerating the depolymerization of the formaldehyde polymer is also provided into the reaction vessel. The accelerator is at least one selected from the group consisting of a chloride of hydrogen chloride, ferrous chloride, ferric chloride, zinc chloride, magnesium chloride and ammonium chloride, a sulfate of ferric sulfate, boric acid, and a borate, etc. In this case, a molar ratio of the formaldehyde polymer relative to sulfur dioxide and the accelerator is in a range of 10 to 300, and preferably 27 to 233.

For example, the method of manufacturing the modified wood material of the present invention is performed as follows. The solid of formaldehyde polymer and a solid of the accelerator are provided into the reaction vessel together with the raw wood material. The air included in the reaction vessel is exhausted to the outside by a vacuum pump. It is preferred that thus exhausted reaction vessel has a pressure of less than $1 \times 10^4$ Pa. Subsequently, the formaldehyde polymer is vaporized by heating the reaction vessel at a reaction temperature of 90° to 120° C. to obtain a vapor of the formaldehyde polymer. When a pressure of the vapor of the formaldehyde polymer is $4.00 \times 10^4$ Pa or more within the reaction vessel, sulfur dioxide is supplied into the reaction vessel. When the pressure is less than $4.00 \times 10^4$ Pa, there is a possibility of causing the discoloration of the modified wood material. As a result, the raw wood material is reacted with the vapor of the formaldehyde polymer in the presence of sulfur dioxide at the reaction temperature for a predetermined time period. In addition, it is further preferred that a total gas pressure within the reaction vessel is in a range of $6 \times 10^4$ to $2.7 \times 10^5$ Pa when the reaction is completed. After the reaction, the unreacted gases of the formaldehyde polymer and sulfur dioxide in the reaction vessel are exhausted to the outside. By the way, though the solid of the formaldehyde polymer is provided into the reaction vessel in the above case, it is not concerned that after a gas of the formaldehyde polymer is introduced into the reaction vessel with the raw wood material, and the gas pressure of the formaldehyde polymer within the reaction vessel is $4.00 \times 10^4$ Pa or more, sulfur dioxide is supplied into the reaction vessel.

EXAMPLE 1

A Japanese cypress board having the size of 160 mm $\times$ 400 mm $\times$ 2 mm was used as a raw wood material. The cypress board was dried by heating at a temperature of 105° C. for 8 hours. The moisture content of thus dried cypress board was 0%. After the drying, fifteen cypress boards were provided into a reaction vessel heated at 100° C. The capacity of the reaction vessel is 20 liters. A ratio of the total volume of the cypress boards relative to the capacity of the reaction vessel is 0.1. Trioxane and ferric sulfate (Fe$_2$(SO$_4$)$_3$) for accelerating thermal depolymerization of trioxane were also provided into the reaction vessel together with the cypress boards. As shown in TABLE 1, the concentration of trioxane is 150 mol/m$^3$ of formaldehyde monomer, and the concentration of ferric sulfate is 0.5 mol/m$^3$. After the reaction vessel was decompressed to about $6.7 \times 10^3$ Pa by a water jet pump, trioxane was vaporized at 100° C. within the reaction vessel. When a pressure of the vapor of trioxane within the reaction vessel was $4.00 \times 10^4$ Pa, sulfur dioxide was supplied into the reaction vessel. The concentration of sulfur dioxide is 5.0 mol/m$^3$. A molar ratio of trioxane relative to sulfur dioxide and ferric sulfate is about 27. Subsequently, the cypress boards were reacted with the vapor of trioxane in the presence of sulfur dioxide and ferric sulfate at a reaction temperature of 100° C. for 22 hours to obtain modified cypress boards. After 22 hours, the total gas pressure within the reaction vessel was $6.7 \times 10^4$ Pa. Gas in the reaction vessel was exhausted to the outside under a pressure of $2.7 \times 10^3 \pm 1.3 \times 10^3$ Pa for 5 hours at 100° C. Since the water jet pump is used for exhausting the remained gas from the reaction vessel, the reaction vessel is decompressed to a pressure as almost same as a vapor pressure of water within the reaction vessel.

EXAMPLE 2

Modified Japanese cypress boards of EXAMPLE 2 were manufactured in accordance with the same method as EXAMPLE 1 except that the concentration of trioxane is 200 mol/m$^3$ of formaldehyde monomer.

EXAMPLE 3

Modified Japanese cypress boards of EXAMPLE 3 were manufactured in accordance with the same method as EXAMPLE 2 except that the reaction temperature is 120° C.

EXAMPLE 4

Modified Japanese cypress boards of EXAMPLE 4 were manufactured in accordance with the same method as EXAMPLE 3 except that the concentration of trioxane is 350 mol/m$^3$ of formaldehyde monomer.

EXAMPLE 5

Modified Japanese cypress boards of EXAMPLE 5 were manufactured in accordance with the same method as EXAMPLE 4 except that the concentration of sulfur dioxide is 1 mol/m$^3$.

EXAMPLE 6

Modified Japanese cypress boards of EXAMPLE 6 were manufactured in accordance with the same method as EXAMPLE 5 except that when the pressure of the vapor of trioxane within the reaction vessel was 6.7×10$^4$ Pa, sulfur dioxide was supplied thereinto.

EXAMPLE 7

Modified Japanese cypress boards of EXAMPLE 7 were manufactured in accordance with the same method as EXAMPLE 6 except that the concentration of ferric sulfate is 1 mol/m$^3$ and the ratio of the total volume of cypress boards relative to the capacity of the reaction vessel is 0.3.

EXAMPLE 8

Modified Japanese cypress boards of EXAMPLE 8 were manufactured in accordance with the same method as EXAMPLE 6 except that the cypress boards having the moisture content of 4 % were provided into the reaction vessel.

EXAMPLE 9

Modified Japanese cypress boards of EXAMPLE 9 were manufactured in accordance with the same method as EXAMPLE 8 except that the cypress boards having the moisture content of 8 % were provided into the reaction vessel.

EXAMPLE 10

Modified Japanese cypress boards of EXAMPLE 10 were manufactured in accordance with the same method as EXAMPLE 7 except that the concentration of sulfur dioxide is 2 mol/m$^3$ and ferric sulfate was not used in EXAMPLE 10.

EXAMPLE 11

Modified Japanese cypress boards of EXAMPLE 11 were manufactured in accordance with the same method as EXAMPLE 4 except that Japanese cypress boards having the size of 160 mm×400 mm×20 mm and the moisture content of 0 % were provided into the reaction vessel.

COMPARATIVE EXAMPLE 1

Modified Japanese cypress boards of COMPARATIVE EXAMPLE 1 were manufactured in accordance with the same method as EXAMPLE 1 except that when the pressure of the vapor of trioxane within the reaction vessel was 6.7×10$^3$ Pa, sulfur dioxide was supplied thereinto.

COMPARATIVE EXAMPLE 2

Modified Japanese cypress boards of COMPARATIVE EXAMPLE 2 were manufactured in accordance with the same method as COMPARATIVE EXAMPLE 1 except that the concentration of trioxane is 15 mol/m$^3$ of formaldehyde monomer.

COMPARATIVE EXAMPLE 3

Modified Japanese cypress boards of COMPARATIVE EXAMPLE 3 were manufactured in accordance with the same method as COMPARATIVE EXAMPLE 1 except that the ratio of the total volume of cypress boards relative to the capacity of the reaction vessel is 0.003.

COMPARATIVE EXAMPLE 4

Modified Japanese cypress boards of COMPARATIVE EXAMPLE 4 were manufactured in accordance with the same method as COMPARATIVE EXAMPLE 1 except that the reaction temperature is 80° C.

COMPARATIVE EXAMPLE 5

Modified Japanese cypress boards of COMPARATIVE EXAMPLE 5 were manufactured in accordance with the same method as EXAMPLE 6 except that the cypress boards having the moisture content of 12 % were provided into the reaction vessel, and also when the pressure of the vapor of trioxane within the reaction vessel was 6.7×10$^3$ Pa, sulfur dioxide was supplied thereinto.

With respect to EXAMPLES 1 to 11 and COMPARATIVE EXAMPLES 1 to 5, an antiswelling efficiency (ASE) was calculated by the equation [1] to examine a dimensional stability of the modified cypress board, that is, $$ASE\ (\%) = \{\ (S1-S2)\ /\ S1\} \times 100 \qquad [1]$$

wherein S1 is a swelling efficiency of the untreated cypress board, and S2 is a swelling efficiency of the modified cypress board. The swelling efficiency (S1) is represented by the equation [2], that is, $$S1\ (\%) = \{\ (B-A)\ /\ A\ \} \times 100 \qquad [2]$$

wherein A is a size of the untreated cypress board after drying thereof, and B is the size of the untreated cypress board after dipping thereof into water for 72 hours under a pressure of 4.00×10$^3$ Pa or less. On the other hand, the swelling efficiency (S2) is represented by the equation [3], that is, $$S2\ (\%) = \{\ (D-C)\ /\ C\ \} \times 100 \qquad [3]$$

wherein C is a size of the modified cypress board after drying thereof, and D is the size of the modified cypress board after dipping thereof into water for 72 hours under the pressure of 4.00×10$^3$ Pa or less.

In addition, a color difference (ΔE*) of the modified cypress board was examined by using a color-difference meter with respect to EXAMPLES 1 to 11 and COMPARATIVE EXAMPLES 1 to 5. The color difference (ΔE*) is represented by the equation [4], that is, $$\Delta E^* = (\Delta L^{*2} + \Delta a^{*2} + \Delta b^{*2})^{\frac{1}{2}} \qquad [4]$$

wherein ΔL*, Δa*, Δb* are respectively differences of coordinates based on uniform color space between the untreated and the modified cypress boards. Results of the above examinations are illustrated in TABLE 2.

TABLE 1

| | TRIOXANE (mol/m³) | SULFUR DIOXIDE (mol/m³) | FERRIC SULFATE (mol/m³) | MOLAR RATIO *1 | PRESSURE OF TRIOXANE (Pa) *2 | MOISTURE CONTENT (%) | REACTION TEMPERATURE (°C) |
|---|---|---|---|---|---|---|---|
| EXAMPLE 1 | 150 | 5 | 0.5 | 27 (30) | $4.0 \times 10^4$ | 0 | 100 |
| EXAMPLE 2 | 200 | 5 | 0.5 | 36 (40) | $4.0 \times 10^4$ | 0 | 100 |
| EXAMPLE 3 | 200 | 5 | 0.5 | 36 (40) | $4.0 \times 10^4$ | 0 | 120 |
| EXAMPLE 4 | 350 | 5 | 0.5 | 64 (70) | $4.0 \times 10^4$ | 0 | 120 |
| EXAMPLE 5 | 350 | 1 | 0.5 | 233 (350) | $4.0 \times 10^4$ | 0 | 120 |
| EXAMPLE 6 | 350 | 1 | 0.5 | 233 (350) | $6.7 \times 10^4$ | 0 | 120 |
| EXAMPLE 7 | 350 | 1 | 1.0 | 175 (350) | $6.7 \times 10^4$ | 0 | 120 |
| EXAMPLE 8 | 350 | 1 | 0.5 | 233 (350) | $6.7 \times 10^4$ | 4 | 120 |
| EXAMPLE 9 | 350 | 1 | 0.5 | 233 (350) | $6.7 \times 10^4$ | 8 | 120 |
| EXAMPLE 10 | 350 | 2 | 0 | 175 (175) | $6.7 \times 10^4$ | 0 | 120 |
| EXAMPLE 11 | 350 | 5 | 0.5 | 64 (70) | $4.0 \times 10^4$ | 0 | 120 |
| EXAMPLE 12 | 225 | 5 | 0.5 | 41 (45) | $4.0 \times 10^4$ | 0 | 100 |
| COMPARATIVE EXAMPLE 1 | 150 | 5 | 0.5 | 27 (30) | $6.7 \times 10^3$ | 0 | 100 |
| COMPARATIVE EXAMPLE 2 | 15 | 5 | 0.5 | 2.7 (3) | $6.7 \times 10^3$ | 0 | 100 |
| COMPARATIVE EXAMPLE 3 | 150 | 5 | 0.5 | 27 (30) | $6.7 \times 10^3$ | 0 | 100 |
| COMPARATIVE EXAMPLE 4 | 150 | 5 | 0.5 | 27 (30) | $6.7 \times 10^3$ | 0 | 80 |
| COMPARATIVE EXAMPLE 5 | 350 | 1 | 0.5 | 233 (350) | $6.7 \times 10^3$ | 12 | 120 |

*1: "Molar ratio" is (trioxane)/{(sulfur dioxide) + (ferric sulfate)}. (trioxane)/(sulfur dioxide) in parenthesis.
*2: Sulfur chloride is supplied into a reaction vessel with the pressure of trioxane.

TABLE 2

| | V/C Ratio*1 | Color Difference ΔE* | Dimens. Stab. (ASE) *2 |
|---|---|---|---|
| EXAMPLE 1 | 0.1 | 1.5 | 50 |
| EXAMPLE 2 | 0.1 | 1.5 | 55 |
| EXAMPLE 3 | 0.1 | 2.5 | 60 |
| EXAMPLE 4 | 0.1 | 2.5 | 65 |
| EXAMPLE 5 | 0.1 | 2.0 | 60 |
| EXAMPLE 6 | 0.1 | 2.0 | 60 |
| EXAMPLE 7 | 0.3 | 2.0 | 55 |
| EXAMPLE 8 | 0.1 | 2.5 | 50 |
| EXAMPLE 9 | 0.1 | 3.0 | 45 |
| EXAMPLE 10 | 0.3 | 2.5 | 55 |
| EXAMPLE 11 | 0.3 | 2.5 | 55 |
| EXAMPLE 12 | 0.1 | 1.5 | 50 |
| COMPARATIVE EXAMPLE 1 | 0.1 | 7.0 | 50 |
| COMPARATIVE EXAMPLE 2 | 0.1 | 10.0 | 15 |
| COMPARATIVE EXAMPLE 3 | 0.003 | 6.0 | 55 |
| COMPARATIVE EXAMPLE 4 | 0.1 | 2.0 | 5 |
| COMPARATIVE EXAMPLE 5 | 0.1 | 5.0 | 20 |

*1: "V/C Ratio" is a ratio of the total volume of cypress boards to be provided into a reaction vessel relative to the capacity of the reaction vessel.
*2: (ASE): Antiswelling Efficiency (%).

In COMPARATIVE EXAMPLES, since sulfur dioxide was supplied into the reaction vessel when the pressure of the vapor of trioxane was $6.7 \times 10^3$ Pa, a discoloration of the modified cypress boards was caused by carbonization of the cypress boards by sulfur dioxide. On the contrary, in EXAMPLES of the present invention, inasmuch as sulfur dioxide was supplied into the reaction vessel when the pressure of the vapor of trioxane was $4.00 \times 10^4$ Pa or more, the discoloration of the modified cypress boards was effectively prevented while keeping high antiswelling efficiency thereof. On the other hand, the modified cypress boards of EXAMPLES 6, 8 and 9 were manufactured by the same method except that the cypress boards having different moisture contents were provided into the reaction vessel. As the moisture content in the cypress board increases, it has a tendency that the modified cypress board shows a lower antiswelling efficiency and larger color difference. In addition, the thick modified cypress boards of EXAMPLE 11 also shows good antiswelling efficiency and color difference. From these results, for preventing the discoloration of the modified cypress board while keeping excellent dimensional stability thereof, it is very effective that sulfur dioxide is supplied into the reaction vessel when the pressure of the vapor of trioxane within the reaction vessel is $4.00 \times 10^4$ Pa or more. All of EXAMPLES 1 to 11 maintain the color difference of 3.0 or less, and the antiswelling efficiency of at least 45%.

EXAMPLE 12

Trioxane and ferric sulfate ($Fe_2(SO_4)_3$) were provided into a large reaction vessel having the capacity of 40 liters such that the concentration of trioxane is 225 mol/m³ of formaldehyde monomer, and also the concentration of ferric sulfate is 0.5 mol/m³, as shown in TABLE 1. Subsequently, the large reaction vessel was heated at a temperature of 100° C. for 4 hours to obtain a mixture gas resulting from trioxane and ferric sulfate therein. On the other hand, fifteen cypress boards of EXAMPLE 1 were provided into the reaction vessel having the capacity of 20 liters of EXAMPLE 1, and then heated at 100° C. for 4 hours. The large reaction vessel is connected with the reaction vessel through a joint valve. After the reaction vessel with the cypress boards was decompressed to $2.7 \times 10^3 \pm 1.3 \times 10^3$ Pa by the water jet pump, the joint valve was opened to introduce the mixture gas into the reaction vessel. When a gas pressure of trioxane within the reaction vessel was $4.0 \times 10^4$ Pa, sulfur dioxide was supplied into the reaction vessel. The concentration of sulfur dioxide is 5.0 mol/m³. The cypress boards were reacted with the gas of trioxane in the presence of sulfur dioxide and ferric sulfate at the reaction temperature of 100° C. for 20 hours to obtain modified cypress boards. After 20 hours, the remained gas in the reaction vessel was exhausted to the outside under the pressure of $2.7 \times 10^3 \pm 1.3 \times 10^3$ Pa for 5 hours at 100° C.

The antiswelling efficiency and the color difference of the modified cypress boards of EXAMPLE 12 were examined in accordance with the same method of EX- AMPLE 1. The modified cypress boards of EXAMPLE 12 show good antiswelling efficiency and color difference which are equal to those of the modified cypress boards in EXAMPLE 1, as shown in TABLE 2.

What is claimed is:

1. A method of manufacturing a modified wood material, comprising:

providing a raw wood material and a formaldehyde polymer in a reaction vessel, a concentration of said formaldehyde polymer being in a range of 30 to 350 mol/m$^3$ expressed in terms of formaldehyde monomer resulting from depolymerization of said formaldehyde polymer;

vaporizing said formaldehyde polymer within the reaction vessel;

supplying sulfur dioxide into the reaction vessel when said formaldehyde polymer is vaporized to produce a gas pressure within said reaction vessel of at least $4.00 \times 10^4$ Pa, a molar ratio of said formaldehyde polymer to sulfur dioxide being in a range of 10 to 350; and reacting said raw wood material with the vapor of said formaldehyde polymer in the presence of sulfur dioxide at a reaction temperature to obtain said modified wood material.

2. A method of manufacturing a modified wood material, comprising:

providing a raw wood material in a reaction vessel;

introducing a formaldehyde polymer gas into the reaction vessel;

supplying sulfur dioxide into the reaction vessel when a gas pressure of said formaldehyde polymer gas reaches at least $4.00 \times 10^4$ Pa, a concentration of said formaldehyde polymer being in a range of 30 to 350 mol/m$^3$ expressed in terms of formaldehyde monomer resulting from depolymerization of said formaldehyde polymer, a molar ratio of said formaldehyde polymer gas to sulfur dioxide being in a range of 10 to 350; and reacting said raw wood material with said formaldehyde polymer gas in the presence of sulfur dioxide at a reaction temperature to obtain said modified wood material.

3. A method according to claim 1 or 2, wherein said raw wood material has a moisture content of 10% or less.

4. A method according to claim 1 or 2, wherein said reaction temperature is in a range of 90° to 120° C.

5. A method according to claim 1 or 2, wherein a ratio of a volume of said raw wood material relative to a volume of the reaction vessel is in a range of 0.01 to 0.4.

6. A method according to claim 2, wherein said reaction chamber contains nitrogen or air in addition to said formaldehyde polymer gas.

7. A method according to claim 1 or 2, wherein said formaldehyde polymer is at least one selected from the group consisting of trioxane, tetraoxane, and paraformaldehyde.

8. A method according to claim 1 or 2, wherein said raw wood material and said formaldehyde polymer is provided into the reaction vessel together with an accelerator for accelerating depolymerization of said formaldehyde polymer to formaldehyde monomer prior to supply of sulfur dioxide thereinto.

9. A method according to claim 8, wherein said accelerator includes at least one selected from the group consisting of hydrogen chloride, zinc chloride, ferrous chloride, ferric chloride, magnesium chlorid, ammonium chloride, ferric sulfate, and boric acid.

10. A method according to claim 8, wherein a molar ratio of said formaldehyde polymer to sulfur dioxide and said accelerator is in a range of 10 to 30).

* * * * *